US010986148B2

(12) United States Patent
Robbin et al.

(10) Patent No.: US 10,986,148 B2
(45) Date of Patent: *Apr. 20, 2021

(54) NETWORK MEDIA DEVICE

(71) Applicant: Apple Inc., Cupertino, CA (US)

(72) Inventors: Jeffrey L. Robbin, Los Altos, CA (US); David Heller, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/256,535

(22) Filed: Jan. 24, 2019

(65) Prior Publication Data

US 2019/0158552 A1 May 23, 2019

Related U.S. Application Data

(60) Continuation of application No. 15/878,208, filed on Jan. 23, 2018, now Pat. No. 10,200,430, which is a
(Continued)

(51) Int. Cl.
| | |
|---|---|
| *G06F 15/16* | (2006.01) |
| *H04L 29/06* | (2006.01) |
| *H04L 12/66* | (2006.01) |
| *H04L 12/931* | (2013.01) |
| *H04L 29/08* | (2006.01) |
| *G06F 3/048* | (2013.01) |
| *G06F 3/0484* | (2013.01) |

(52) U.S. Cl.
CPC .......... *H04L 65/4084* (2013.01); *G06F 3/048* (2013.01); *H04L 12/66* (2013.01); *H04L 49/604* (2013.01); *H04L 65/1069* (2013.01); *H04L 65/4092* (2013.01); *H04L 67/06* (2013.01); *G06F 3/0484* (2013.01)

(58) Field of Classification Search
CPC ............ H04L 65/4084; H04L 65/1069; H04L 65/4092; H04L 67/06; H04L 49/604; H04L 12/66; G06F 3/048; G06F 3/0484
See application file for complete search history.

(56) References Cited

U.S. PATENT DOCUMENTS

| | | |
|---|---|---|
| 4,807,224 A | 2/1989 | Marin |
| 5,534,911 A | 7/1996 | Levitan |
(Continued)

FOREIGN PATENT DOCUMENTS

| | | |
|---|---|---|
| EP | 0146334 A2 | 6/1985 |
| EP | 0830026 A2 | 3/1998 |
(Continued)

OTHER PUBLICATIONS

MG-25, Portable MPEG4 Player (MG-25), Jul. 29, 2004, 1-3 pgs. (U.S. Appl. No. 11/519,429).
(Continued)

*Primary Examiner* — Philip B Tran
(74) *Attorney, Agent, or Firm* — Fletcher Yoder PC (57) ABSTRACT

A network media device is described that pulls multimedia data from one or more sources (e.g., a multimedia website or a multimedia server computer) at a first time, stores it to long-term storage within the device and transmits the stored multimedia data to one or more designated multimedia playback devices at a second time.

20 Claims, 5 Drawing Sheets

Related U.S. Application Data continuation of application No. 15/246,011, filed on Aug. 24, 2016, now Pat. No. 9,876,830, which is a continuation of application No. 13/869,238, filed on Apr. 24, 2013, now Pat. No. 9,448,683, which is a continuation of application No. 13/175,442, filed on Jul. 1, 2011, now Pat. No. 8,443,038, which is a division of application No. 11/530,855, filed on Sep. 11, 2006, now abandoned, which is a continuation-in-part of application No. 11/306,557, filed on Jan. 2, 2006, now abandoned, which is a continuation of application No. 10/862,115, filed on Jun. 4, 2004, now Pat. No. 8,797,926.

(56) References Cited

U.S. PATENT DOCUMENTS

| | | | |
|---|---|---|---|
| 5,535,381 | A | 7/1996 | Kopper |
| 5,553,222 | A | 9/1996 | Milne et al. |
| 5,559,945 | A | 9/1996 | Beaudet et al. |
| 5,583,993 | A | 12/1996 | Foster et al. |
| 5,587,404 | A | 12/1996 | Kroner et al. |
| 5,613,863 | A | 3/1997 | Klaus et al. |
| 5,616,876 | A | 4/1997 | Cluts |
| 5,640,566 | A | 6/1997 | Victor et al. |
| 5,664,044 | A | 9/1997 | Ware |
| 5,664,226 | A | 9/1997 | Czako et al. |
| 5,666,530 | A | 9/1997 | Clark et al. |
| 5,696,948 | A | 12/1997 | Cruz et al. |
| 5,709,521 | A | 1/1998 | Glass et al. |
| 5,710,922 | A | 1/1998 | Alley et al. |
| 5,721,949 | A | 2/1998 | Smith et al. |
| 5,722,041 | A | 2/1998 | Freadman |
| 5,727,202 | A | 3/1998 | Kucala |
| 5,739,451 | A | 4/1998 | Winksy et al. |
| 5,745,583 | A | 4/1998 | Koizumi et al. |
| 5,751,997 | A | 5/1998 | Kullick et al. |
| 5,790,521 | A | 8/1998 | Lee et al. |
| 5,815,297 | A | 9/1998 | Ciciora |
| 5,835,721 | A | 11/1998 | Donahue et al. |
| 5,835,732 | A | 11/1998 | Kikinis et al. |
| 5,845,282 | A | 12/1998 | Alley et al. |
| 5,864,868 | A | 1/1999 | Contois |
| 5,867,668 | A | 2/1999 | Spirakis et al. |
| 5,875,354 | A | 2/1999 | Charlton et al. |
| 5,918,213 | A | 6/1999 | Bernard et al. |
| 5,918,303 | A | 6/1999 | Yamaura et al. |
| 5,923,757 | A | 7/1999 | Hocker et al. |
| 5,925,843 | A | 7/1999 | Miller et al. |
| 5,931,906 | A | 8/1999 | Fidelibus, Jr. et al. |
| 5,953,350 | A | 9/1999 | Higgins |
| 5,963,916 | A | 10/1999 | Kaplan |
| 5,969,283 | A | 10/1999 | Looney et al. |
| 6,000,000 | A | 12/1999 | Hawkins et al. |
| 6,006,274 | A | 12/1999 | Hawkins et al. |
| 6,008,777 | A | 12/1999 | Yiu |
| 6,038,199 | A | 3/2000 | Pawlowski et al. |
| 6,041,023 | A | 3/2000 | Lakhansingh |
| 6,061,306 | A | 5/2000 | Buchheim |
| 6,085,252 | A | 7/2000 | Zhu et al. |
| 6,092,119 | A | 7/2000 | Rossmere et al. |
| 6,101,591 | A | 8/2000 | Foster et al. |
| 6,125,369 | A | 9/2000 | Wu et al. |
| 6,138,245 | A | 10/2000 | Son et al. |
| 6,166,314 | A | 12/2000 | Weinstock et al. |
| 6,172,948 | B1 | 1/2001 | Keller et al. |
| 6,208,044 | B1 | 3/2001 | Viswanadham et al. |
| 6,212,359 | B1 | 4/2001 | Knox |
| 6,216,131 | B1 | 4/2001 | Liu et al. |
| 6,243,328 | B1 | 6/2001 | Fenner et al. |
| 6,243,725 | B1 | 6/2001 | Hempleman et al. |
| 6,243,772 | B1 | 6/2001 | Ghori et al. |
| 6,247,135 | B1 | 6/2001 | Feague |
| 6,248,946 | B1 | 6/2001 | Dwek |
| 6,263,313 | B1 | 7/2001 | Milsted et al. |
| 6,263,503 | B1 | 7/2001 | Margulis |
| 6,272,545 | B1 | 8/2001 | Flanagin et al. |
| 6,282,714 | B1 | 8/2001 | Ghori et al. |
| 6,283,764 | B2 | 9/2001 | Kajiyama et al. |
| 6,295,541 | B1 | 9/2001 | Bodnar et al. |
| 6,332,175 | B1 | 12/2001 | Birrell et al. |
| 6,338,044 | B1 | 1/2002 | Cook et al. |
| 6,341,316 | B1 | 1/2002 | Kloba et al. |
| 6,345,256 | B1 | 2/2002 | Katz et al. |
| 6,356,971 | B1 | 3/2002 | Katz et al. |
| 6,374,177 | B1 | 4/2002 | Lee et al. |
| 6,380,947 | B1 | 4/2002 | Stead |
| 6,389,467 | B1 | 5/2002 | Eyal |
| 6,397,388 | B1 | 5/2002 | Allen |
| 6,411,943 | B1 | 6/2002 | Crawford |
| 6,429,880 | B2 | 8/2002 | Marcos et al. |
| 6,453,281 | B1 | 9/2002 | Walters et al. |
| 6,489,986 | B1 | 12/2002 | Allen |
| 6,490,432 | B1 | 12/2002 | Wegener et al. |
| 6,493,758 | B1 | 12/2002 | McLain |
| 6,523,124 | B1 | 2/2003 | Lunsford et al. |
| 6,529,233 | B1 | 3/2003 | Allen |
| 6,529,804 | B1 | 3/2003 | Draggon et al. |
| 6,546,428 | B2 | 4/2003 | Baber et al. |
| 6,563,769 | B1 | 5/2003 | Van Der Meulen |
| 6,587,403 | B1 | 7/2003 | Keller et al. |
| 6,587,404 | B1 | 7/2003 | Keller et al. |
| 6,587,480 | B1 | 7/2003 | Higgins et al. |
| 6,621,768 | B1 | 9/2003 | Keller et al. |
| 6,630,963 | B1 | 10/2003 | Billmaier |
| 6,636,873 | B1 | 10/2003 | Carini et al. |
| 6,659,861 | B1 | 12/2003 | Faris et al. |
| 6,664,981 | B2 | 12/2003 | Ashe et al. |
| 6,665,803 | B2 | 12/2003 | Lunsford et al. |
| 6,684,060 | B1 | 1/2004 | Curtin |
| 6,694,200 | B1 | 2/2004 | Naim |
| 6,718,348 | B1 | 4/2004 | Novak et al. |
| 6,721,489 | B1 | 4/2004 | Benyamin et al. |
| 6,728,585 | B2 | 4/2004 | Neoh |
| 6,728,729 | B1 | 4/2004 | Jawa et al. |
| 6,731,312 | B2 | 5/2004 | Robbin |
| 6,744,738 | B1 | 6/2004 | Park et al. |
| 6,757,913 | B2 | 6/2004 | Knox |
| 6,760,721 | B1 | 7/2004 | Chasen et al. |
| 6,763,345 | B1 | 7/2004 | Hempleman et al. |
| 6,766,376 | B2 | 7/2004 | Price |
| 6,779,019 | B1 | 8/2004 | Mousseau et al. |
| 6,785,542 | B1 | 8/2004 | Blight et al. |
| 6,794,566 | B2 | 9/2004 | Pachet |
| 6,798,838 | B1 | 9/2004 | Ngo |
| 6,801,964 | B1 | 10/2004 | Mahdavi |
| 6,831,881 | B2 | 12/2004 | Patil et al. |
| 6,845,398 | B1 | 1/2005 | Galensky et al. |
| 6,874,037 | B1 | 3/2005 | Abram et al. |
| 6,898,159 | B2 | 5/2005 | Kudo |
| 6,920,179 | B1 | 7/2005 | Anand et al. |
| 6,925,595 | B1 | 8/2005 | Whitledge et al. |
| 6,928,433 | B2 | 8/2005 | Goodman et al. |
| 6,929,058 | B2 | 8/2005 | Liu et al. |
| 6,935,627 | B2 | 8/2005 | Jung |
| 6,941,324 | B2 | 9/2005 | Plastina et al. |
| 6,944,880 | B1 | 9/2005 | Allen |
| 6,947,598 | B2 | 9/2005 | Yogeshwar et al. |
| 6,956,562 | B1 | 10/2005 | O'Hara et al. |
| 6,959,288 | B1 | 10/2005 | Medina et al. |
| 6,959,562 | B2 | 11/2005 | Navedo et al. |
| 6,978,127 | B1 | 12/2005 | Bulthuis et al. |
| 6,981,259 | B2 | 12/2005 | Luman et al. |
| 6,985,966 | B1 | 1/2006 | Gupta et al. |
| 6,987,221 | B2 | 1/2006 | Platt |
| 6,993,532 | B1 | 1/2006 | Platt et al. |
| 6,993,722 | B1 | 1/2006 | Greer et al. |
| 6,999,826 | B1 | 2/2006 | Zhou et al. |
| 7,010,758 | B2 | 3/2006 | Bate |
| 7,016,443 | B1 | 3/2006 | Splett |
| 7,022,905 | B1 | 4/2006 | Hinman et al. |
| 7,024,214 | B2 | 4/2006 | Loveland |
| 7,024,491 | B1 | 4/2006 | Hanmann et al. |
| 7,024,575 | B2 | 4/2006 | Lienhart et al. |

(56) References Cited

U.S. PATENT DOCUMENTS

| | | |
|---|---|---|
| 7,034,891 B2 | 4/2006 | Joung et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,310 B2 | 7/2006 | Hirayama et al. |
| 7,082,320 B2 | 7/2006 | Kattukaran et al. |
| 7,084,898 B1 | 8/2006 | Firestone et al. |
| 7,096,271 B1 | 8/2006 | Gupta et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,143,939 B2 | 12/2006 | Henzerling |
| 7,146,322 B2 | 12/2006 | Cowgill |
| 7,166,791 B2 | 1/2007 | Robbin et al. |
| 7,174,560 B1 | 2/2007 | Crinon |
| 7,184,774 B2 | 2/2007 | Robinson et al. |
| 7,185,084 B2 | 2/2007 | Sirivara et al. |
| 7,194,692 B2 | 3/2007 | Marcos et al. |
| 7,200,357 B2 | 4/2007 | Janik et al. |
| 7,228,054 B2 | 6/2007 | Cowgill |
| 7,260,714 B2 | 8/2007 | Dawson et al. |
| 7,266,713 B2 | 9/2007 | Lienhart et al. |
| 7,281,141 B2 | 10/2007 | Elkayam et al. |
| 7,283,880 B2 | 10/2007 | Dick |
| 7,289,393 B2 | 10/2007 | Keller et al. |
| 7,295,809 B2 | 11/2007 | Moore |
| 7,295,983 B2 | 11/2007 | Fujiwara et al. |
| 7,302,239 B2 | 11/2007 | Jitsuhara |
| 7,305,691 B2 | 12/2007 | Cristofalo |
| 7,312,785 B2 | 12/2007 | Tsuk et al. |
| 7,330,868 B2 | 2/2008 | Kawasaki et al. |
| 7,336,675 B2 | 2/2008 | Naik et al. |
| 7,343,553 B1 | 3/2008 | Kaye |
| 7,346,698 B2 | 3/2008 | Hannaway |
| 7,359,671 B2 | 4/2008 | Richenstein et al. |
| 7,367,701 B2 | 5/2008 | Lee |
| 7,369,532 B2 | 5/2008 | Silvester |
| 7,370,129 B2 | 5/2008 | Green et al. |
| 7,391,791 B2 | 6/2008 | Balassanian et al. |
| 7,406,294 B1 | 7/2008 | Liu |
| 7,418,472 B2 | 8/2008 | Shoemaker et al. |
| 7,418,673 B2 | 8/2008 | Oh |
| 7,424,024 B2 | 9/2008 | Chen et al. |
| 7,430,753 B2 | 9/2008 | Gray et al. |
| 7,437,158 B2 | 10/2008 | Russell |
| 7,444,388 B1 | 10/2008 | Svendsen |
| 7,447,815 B2 | 11/2008 | Weaver et al. |
| 7,469,283 B2 | 12/2008 | Eyal et al. |
| 7,471,988 B2 | 12/2008 | Smith et al. |
| 7,474,677 B2 | 1/2009 | Trott |
| 7,477,653 B2 | 1/2009 | Smith et al. |
| 7,480,746 B2 | 1/2009 | Simon et al. |
| 7,483,538 B2 | 1/2009 | McCarty et al. |
| 7,502,604 B2 | 3/2009 | Knox |
| 7,505,483 B2 | 3/2009 | Jeon et al. |
| 7,508,815 B2 | 3/2009 | Lapeyre et al. |
| 7,519,681 B2 | 4/2009 | Edwards et al. |
| 7,519,686 B2 | 4/2009 | Hong et al. |
| 7,532,862 B2 | 5/2009 | Cheshire |
| 7,539,777 B1 | 5/2009 | Aitken |
| 7,542,784 B2 | 6/2009 | Passier et al. |
| 7,543,245 B2 | 6/2009 | Irimajiri |
| 7,555,291 B2 | 6/2009 | Wassingbo |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |
| 7,620,011 B2 | 11/2009 | Kim et al. |
| 7,627,343 B2 | 12/2009 | Fadell et al. |
| 7,634,227 B2 | 12/2009 | de Jong |
| 7,647,346 B2 | 1/2010 | Silverman et al. |
| 7,650,470 B2 | 1/2010 | Poo |
| 7,657,706 B2 | 2/2010 | Iyer et al. |
| 7,680,849 B2 | 3/2010 | Heller et al. |
| 7,689,095 B2 | 3/2010 | Sugiyama et al. |
| 7,698,297 B2 | 4/2010 | Jawa et al. |
| 7,698,723 B2 | 4/2010 | Hicks, III et al. |
| 7,706,901 B2 | 4/2010 | Berreth |
| 7,724,780 B2 | 5/2010 | Baird et al. |
| 7,725,912 B2 | 5/2010 | Margulis |
| 7,734,688 B2 | 6/2010 | Langdon |
| 7,765,326 B2 | 7/2010 | Robbin et al. |
| 7,769,903 B2 | 8/2010 | Robbin et al. |
| 7,797,446 B2 | 9/2010 | Heller et al. |
| 7,821,574 B2 | 10/2010 | Black |
| 7,827,259 B2 | 11/2010 | Heller et al. |
| 7,853,341 B2 | 12/2010 | McCarty et al. |
| 7,890,661 B2 | 2/2011 | Spurgat et al. |
| 7,899,915 B2 | 3/2011 | Reisman |
| 7,903,690 B2 | 3/2011 | Wakid |
| 7,950,037 B2 | 5/2011 | Mensch |
| 7,996,505 B2 | 8/2011 | Krantz et al. |
| 8,037,220 B2 | 10/2011 | Moore et al. |
| 8,169,938 B2 | 5/2012 | Duchscher et al. |
| 8,184,657 B2 | 5/2012 | Dacosta |
| 8,214,447 B2 | 7/2012 | Deslippe et al. |
| 8,266,657 B2 | 9/2012 | Margulis |
| 8,284,739 B2 | 10/2012 | Doyle et al. |
| 8,285,727 B2 | 10/2012 | Weber et al. |
| 8,374,087 B2 | 2/2013 | Dacosta |
| 8,443,038 B2 | 5/2013 | Robbin et al. |
| 8,539,533 B2 | 9/2013 | Caspi et al. |
| 8,797,926 B2 | 8/2014 | Kearney, III et al. |
| 9,448,683 B2 | 9/2016 | Robbin et al. |
| 10,200,430 B2 * | 2/2019 | Robbin ............... H04L 12/66 |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1 | 1/2002 | Baber et al. |
| 2002/0019984 A1 | 2/2002 | Rakib |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0059363 A1 * | 5/2002 | Katz ..................... H04L 67/02 |
| | | 709/203 |
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Coles et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta et al. |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2002/0196912 A1 | 12/2002 | Norris |
| 2003/0013332 A1 | 1/2003 | Lin |
| 2003/0013492 A1 | 1/2003 | Bokhari et al. |
| 2003/0013493 A1 | 1/2003 | Irimajiri et al. |
| 2003/0030733 A1 | 2/2003 | Seaman et al. |
| 2003/0037254 A1 | 2/2003 | Fischer et al. |
| 2003/0045955 A1 | 3/2003 | Janik |

(56) References Cited

U.S. PATENT DOCUMENTS

| | | |
|---|---|---|
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1 | 9/2003 | Cheshire |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |
| 2004/0017997 A1 | 1/2004 | Cowgill |
| 2004/0027930 A1 | 2/2004 | Kudo |
| 2004/0031058 A1 | 2/2004 | Reisman |
| 2004/0045030 A1 | 3/2004 | Reynolds et al. |
| 2004/0055446 A1 | 3/2004 | Robbin et al. |
| 2004/0057446 A1 | 3/2004 | Varsa et al. |
| 2004/0068536 A1 | 4/2004 | Demers et al. |
| 2004/0072584 A1 | 4/2004 | Kern |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139233 A1 | 7/2004 | Kellerman et al. |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1 | 9/2004 | Weber et al. |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215611 A1 | 10/2004 | Jawa et al. |
| 2004/0215810 A1 | 10/2004 | Tan et al. |
| 2004/0216108 A1 | 10/2004 | Robbin |
| 2004/0221088 A1 | 11/2004 | Ohta et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Guillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks et al. |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker et al. |
| 2005/0089052 A1 | 4/2005 | Chen et al. |
| 2005/0147130 A1 | 7/2005 | Hurwitz et al. |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1 | 12/2005 | Kearney et al. |
| 2005/0289224 A1 | 12/2005 | Deslippe et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Len |
| 2006/0062242 A1 | 3/2006 | Dacosta |
| 2006/0062243 A1 | 3/2006 | Dacosta |
| 2006/0067463 A1 | 3/2006 | Hack et al. |
| 2006/0069724 A1 | 3/2006 | Langdon |
| 2006/0074637 A1 | 4/2006 | Berreth |
| 2006/0083194 A1 | 4/2006 | Dhrimaj et al. |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling et al. |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159101 A1* | 7/2006 | Turk ............... H04L 29/12283 370/395.2 |
| 2006/0159109 A1 | 7/2006 | Lamkin et al. |
| 2006/0161635 A1* | 7/2006 | Lamkin ............... G06F 16/4387 709/217 |
| 2006/0166716 A1* | 7/2006 | Seshadri ............. H04M 1/6033 455/575.2 |
| 2006/0167982 A1 | 7/2006 | Jawa et al. |
| 2006/0168340 A1 | 7/2006 | Heller et al. |
| 2006/0168351 A1 | 7/2006 | Ng et al. |
| 2006/0224620 A1 | 10/2006 | Silverman et al. |
| 2006/0242259 A1* | 10/2006 | Vallabh ................. H04N 21/472 709/217 |
| 2006/0245451 A1 | 11/2006 | Wakid |
| 2006/0253279 A1 | 11/2006 | Sung |
| 2006/0274747 A1 | 12/2006 | Duchscher et al. |
| 2006/0277216 A1 | 12/2006 | Shukhman |
| 2006/0288057 A1 | 12/2006 | Collins et al. |
| 2007/0033052 A1 | 2/2007 | Cowgill |
| 2007/0038941 A1 | 2/2007 | Wysocki et al. |
| 2007/0067309 A1 | 3/2007 | Klein, Jr. et al. |
| 2007/0073723 A1 | 3/2007 | Ramer et al. |
| 2007/0073728 A1 | 3/2007 | Klein, Jr. et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0110074 A1 | 5/2007 | Bradley et al. |
| 2007/0124680 A1 | 5/2007 | Robbin et al. |
| 2007/0130541 A1 | 6/2007 | Louch et al. |
| 2007/0136778 A1* | 6/2007 | Birger ................. H04N 21/4113 725/117 |
| 2007/0169115 A1 | 7/2007 | Ko et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0250761 A1 | 10/2007 | Bradley et al. |
| 2007/0271312 A1 | 11/2007 | Heller et al. |
| 2007/0274271 A1* | 11/2007 | Jones .................... H04W 8/005 370/338 |
| 2007/0288986 A1* | 12/2007 | Candelore .......... H04N 7/17318 725/132 |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0086494 A1 | 4/2008 | Heller et al. |
| 2008/0164581 A1 | 7/2008 | Cho et al. |
| 2008/0168185 A1 | 7/2008 | Robbin et al. |
| 2008/0168245 A1 | 7/2008 | De et al. |

(56) References Cited

U.S. PATENT DOCUMENTS

| | | | |
|---|---|---|---|
| 2008/0168391 | A1 | 7/2008 | Robbin et al. |
| 2008/0168525 | A1 | 7/2008 | Heller et al. |
| 2008/0168526 | A1 | 7/2008 | Robbin et al. |
| 2008/0229335 | A1 | 9/2008 | Robbin et al. |
| 2009/0290725 | A1 | 11/2009 | Huang |
| 2011/0264732 | A1 | 10/2011 | Robbin et al. |
| 2014/0006946 | A1 | 1/2014 | Robbin et al. |
| 2014/0244863 | A1 | 8/2014 | Bradley et al. |
| 2014/0307585 | A1 | 10/2014 | Kearney, III et al. |

FOREIGN PATENT DOCUMENTS

| | | |
|---|---|---|
| EP | 0917077 A2 | 5/1999 |
| EP | 0982732 A1 | 3/2000 |
| EP | 1028425 A2 | 8/2000 |
| EP | 1112931 A2 | 7/2001 |
| EP | 1122931 A2 | 8/2001 |
| EP | 1143719 A2 | 10/2001 |
| EP | 1353269 A2 | 10/2003 |
| EP | 1408427 A2 | 4/2004 |
| EP | 1429569 A1 | 6/2004 |
| EP | 1463334 A2 | 9/2004 |
| EP | 1523171 A1 | 4/2005 |
| EP | 1548740 A2 | 6/2005 |
| EP | 1751949 A1 | 2/2007 |
| EP | 2360887 A1 | 8/2011 |
| EP | 2375678 A1 | 10/2011 |
| JP | 2000-339917 A | 12/2000 |
| JP | 2001-093226 A | 4/2001 |
| JP | 2001-117800 A | 4/2001 |
| JP | 2003-077214 A | 3/2003 |
| JP | 2003-303137 A | 10/2003 |
| JP | 2003-319485 A | 11/2003 |
| KR | 10-2001-0063284 A | 7/2001 |
| KR | 10-2001-0079176 A | 8/2001 |
| KR | 10-2002-0001127 A | 1/2002 |
| KR | 10-2002-0011027 A | 2/2002 |
| KR | 10-2006-0035634 A | 4/2006 |
| KR | 10-0599204 B1 | 7/2006 |
| WO | 94/08337 A1 | 4/1994 |
| WO | 95/16950 A1 | 6/1995 |
| WO | 00/43914 A | 7/2000 |
| WO | 01/26374 A1 | 4/2001 |
| WO | 01/33569 A1 | 5/2001 |
| WO | 01/67753 A1 | 9/2001 |
| WO | 02/25610 A1 | 3/2002 |
| WO | 02/25935 A2 | 3/2002 |
| WO | 02/65723 A1 | 8/2002 |
| WO | 02/65732 A1 | 8/2002 |
| WO | 2003/009601 A1 | 1/2003 |
| WO | 2003/023786 A2 | 3/2003 |
| WO | 03/38637 A1 | 5/2003 |
| WO | 2003/036541 A1 | 5/2003 |
| WO | 2004/004338 A1 | 1/2004 |
| WO | 2004/034286 A1 | 4/2004 |
| WO | 2004/057474 A1 | 7/2004 |
| WO | 2004/084413 A2 | 9/2004 |
| WO | 2005/060387 A2 | 7/2005 |
| WO | 2005/114472 A1 | 12/2005 |
| WO | 2005/122531 A1 | 12/2005 |
| WO | 2006/007322 A2 | 1/2006 |
| WO | 2006/047578 A2 | 5/2006 |
| WO | 2007/079360 A1 | 7/2007 |
| WO | 2007/079334 A3 | 8/2007 |
| WO | 2008/033771 A2 | 3/2008 |

OTHER PUBLICATIONS

Mcgavren, "iTunes-perl," 2004-2006 (http://code.googlecom, 5 pgs (downloaded Jan. 13, 2012 from http://code.google.com/p/itunes-perl/wiki/ Usage).
Maulik, "Synchronizing mp3 playback, version #2," http://snarfed.org/exec/version?name=synchronizing+mp3+playback&version=2, generated Jun. 8, 2006, version #2 dated Dec. 28, 2004 in history, 2 pgs.
Maulik, "Synchronizing mp3 playback, version #1," obtained from http://snarfed.org/exec/version?name=synchronizing+mp3+playback&version=1, generated Jun. 8, 2006, version #1 dated Nov. 8, 2004 in history, 2-pgs.
Maulik and Ryan, "Synchronizing mp3 playback, version #9," http://snarfed.org/exec/version?name=synchronizing+mp3+playback&version=9, generated Jun. 8, 2006, version #4 dated Mar. 3, 2005 in history, 3 pgs.
Maulik and Ryan, "Synchronizing mp3 playback, version #8," http://snarfed.org/exec/version?name=synchronizing+mp3+playback&version=8, generated Jun. 8, 2006, version #8 dated Feb. 23, 2005 in history, 3 pgs.
Maulik and Ryan, "Synchronizing mp3 playback, version #6," http://snarfed.org/exec/version?name=synchronizing+mp3+playback&version=6, generated Jun. 8, 2006, version #6 dated Feb. 2, 2005 in history, 3 pgs.
Maulik and Ryan, "Synchronizing mp3 playback, version #5," http://snarfed.org/exec/version?name=synchronizing+mp3+playback&version=5, generated Jun. 8, 2006, version #5 dated Jan. 19, 2005 in history, 3 pgs.
Maulik and Ryan, "Synchronizing mp3 playback, version #4," http://snarfed.org/exec/version?name=synchronizing+mp3+playback&version=4, generated Jun. 8, 2006, version #4 dated Jan. 3, 2005 in history, 3 pgs.
Maulik and Ryan, "Synchronizing mp3 playback, version #3," obtained from http://snarfed.org/exec/version?name=synchronizing+mp3+playback&version=3-, generated Jun. 8, 2006, version #3 dated Jan. 2, 2005 in history, 3-pgs.
Maulik and Ryan, "Synchronizing mp3 playback, version #17," http://snarfed.org/exec/version?name=synchronizing+mp3+playback&version=17, generated Jun. 8, 2006, version #17 dated Feb. 5, 2005 in history, 4 pgs.
Mauli Kand Ry A N "Synchronizing mp3 playback, version#7," obtainedfromhttp://snarfed.org/exec/Nersion? name-synchronizing+rp3hplaybackuerllon7generatedJun. 8, 2006versi on#?datedFeb. 21, 2005nhistoy3pg s.
M. Nilsson; IDS tag versions 2.4.0,—Main Structure; Nov. 1, 2000; http://www.id3.org/id3v2.4.0-structure?.about.action=print dowload Jul. 6, 2011 (U.S. Appl. No. 11/519,429).
M. Nilsson; ID3tag version 2.3.0; Feb. 3, 1999, http://www.id3lib.or/idev2.3.0.html [30 pages Jun. 29, 2011 at http://www/id3.org/id3v2.3.0?action=print] (U.S. Appl. No. 11/519,429).
Linksys "New Linksys Wireless Home Products Showcased at CEBIT 2004" Internet Article (Mar. 18, 2004) www.broadbandbuyer.co.uk/Shop/pageTextDetail.asp?Sell0=2&TextI0=473.
Lindauer, "What's in Your Pocket?," Edgereview, 2 pgs (downloaded Jan. 25, 2002 from http://www.edgereview.com/print.cfm?Type+aag&ID=286).
K*Software, "kquery.com," obtained from http://www.kquery.com/index.php?page=software_info&subpage=1&id=8, generated Jun. 8, 2006, copyright 2004, 4-pgs.
ITunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/Usage) (U.S. Appl. No. 11/519,429).
ITunes, Playlist Related Help Screens, iTunes v1.0, Apple Computer, Inc., Jan. 2001 (U.S. Appl. No. 11/519,429).
ITunes, Digital Music for your Mac, Apple Computer, Inc., downloaded Oct. 22, 2011, http://www.apple.com/itunes/ (U.S. Appl. No. 11/519,429).
ITunes 2, Playlist Related Help Screens, iTunes v2.0 Apple Computer, Inc., Oct. 23, 2001 (U.S. Appl. No. 11/519,429).
Iriver, "PMP140/120", Sep. 13, 2004, 1-2 pgs. (U.S. Appl. No. 11/519,429).
Hughes, M., "Turning Streams Inside Out, Part 2: Optimizing internal Java I/O", Sep. 3, 2002, 12 pages. [downloaded Apr. 11, 2012 at: http://underpop.free.fr/j/java/streams/j-io2.pdf] (U.S. Appl. No. 11/306,557).
Hewlett Packard, "Hewlett Packard Jornada 525 Color Pocket PC," (downloaded Jan. 25, 2002, http://www.pc4d.com/electronics/ products/56/jornada 525 color pocket pc.shtml).

(56) References Cited

OTHER PUBLICATIONS

Hewlett Packard Jornada 525 Color Pocket PC, downloaded Jan. 25, 2002, http://www.pc4d.com/electronics/products/56/jornada.sub.-525.sub.-color-.sub.-pocket.sub.-pc.shtml. (U.S. Appl. No. 11/519,429).
Hei et al., "iPod+iTunes," iTunes7, Markt+Technik Verlag, 54 pgs, Dec. 22, 2006 (German).
Harmony Central, "Diamond Multimedia Announces Rio PMP300 Portable MP3 Music Player", Press Release, 4 pgs, Sep. 14, 1998 (http://news.harmony-central.com/Newp/1988/Rio- Pump300.html, downloaded Aug. 16, 2011 from http://web.archive.org/web/20030705005208/http:/.
Handbook for Palm.TM. m500 Series Handhelds,User Manual.—(286 pages) (U.S. Appl. No. 11/519,429).
Glenn Fleishman, "Handheld iPod joins MP3 band a bit late, but is standout player," Nov. 6, 2001, http://seattletimes,nwsource.com/html/businesstechnology/134361811.sub.—ptmacc040.html. [Downloaded Jul. 21, 2011 from http://web.archive.org/...001110233639/http://seattletimes.nwsource.com/h-tml/businesstechnology/134361811.sub.-ptmacc040.html] (U.S. Appl. No. 11/519,429).
Fukuda, "Perfect Guide for Digital/Auio Technique to Enjoy Music in PC," Nikkei Click, Japan, Nikkei Business Publications, Inc., vol. 6, No. 10, 1 pg, Sep. 8, 1999 (not attached herewith).
Firewire, IEEE 1394 (also known as Sony's iLink), (http://www.wikipedia.org/wiki/Firewire (1995)). Download Jul. 13, 2011—http://en.wikipedia.org/wiki/IEEE.sub-1393.sub.-interface (U.S. Appl. No. 11/519,429).
Etchison, "Accelerated discrete Adjustment of the Parameters of a Process", IBM Technical Disclosure Bulletin, vol. 15, No. 5, Oct. 1, 1972, 2 pgs. (U.S. Appl. No. 11/519,429).
Escient, Inc., "TuneBase Pro Mk-II User's Guide," 1999 (downloaded Jul. 25, 2011) (not attached herewith).
Erdmann et al., "iPod+iTunes," O'Reilly, 157 pgs, 2006 (German).
Engst, "SoundJam Keeps on Jammin'," 4 pgs, Jun. 19, 2000, (http://db.tidbits.com/getbits.acgi?lbart=05988, downloaded Jul. 25, 2011 from http?..db.tidbits.com/article/5988?print.sub.-version+1).
Digital Still Cameras—Downloading Images to a Computer, Mimi Chakarova et al., Multi-Media Reporting and Convergence, 2 pgs. (U.S. Appl. No. 11/519,429).
Diamond Multimedia Announces Rio PMP300 Portable MP3 Music Player, Press Release, http://news.harmony-central.com/Newp/1988/Rio-Pump300.html, Sep. 14, 1998, 4 pgs. Downloaded on Aug. 16, 2011—http://www.archive.org/web/20030705005208/http://news.harmony-centr-al.com/Newp/1998/Rio-PMP300/html (U.S. Appl. No. 11/519,429).
De Herrera, Chris, "Microsoft ActiveSync 3.1" Version 1.02, (Oct. 13, 2000 Downloaded Aug. 16, 2011 From http://www.pocketpcfaq.com/wce/activesync3.1.htm (U.S. Appl. No. 11/519,429).
Compaq Computer Corp., copyright 1991, Personal Jukebox User Manual, pp. 1-29. (U.S. Appl. No. 11/519,429).
Compaq Computer Corp., "Systems Research Center and PAAD," Personal Jukebox (PJB), 25 pgs, Oct. 13, 2000 (downloaded from http://research.compaq.com/SRC/pjb/; redownloaded Apr. 2016 from http://birrell.org/andrew/talks/pjb-overview.pdf).
Compaq Computer Corp., "Personal Jukebox," 2 pgs, Jan. 24, 2001 (downloaded from http://research.compaq.com/SRC/pjb/).
Clifton, "Pipe.c, A Kla2 Module," 8 pgs, 2003 (retrieved Oct. 17, 2011 from http://www.codelode.com/Kernel/k1a2pepec.html, downloaded Apr. 18, 2012 from http://web.archive.org/2004010719482/http://www.codelode.com/Ke-mel/kla2pipec . . . ).
Chakarova et al., "Digital Still Cameras,Downloading Images to a Computer," Multi-Media Reporting and Convergence, 2 pgs.
Butler, "Portable MP3: The Nomad Jukebox," Aug. 1, 2001 (http:lldb.tidbits.com/getbits.acgi? tbart=06261, downloaded Jul. 13, 2011 from http://www.tidbits.com/article/6261).
Butler, "Archos Jukebox 6000 Challenges Nomad Jukebox," 6 pgs, Aug. 13, 2001 (from http://db.tidbits.com/getbits.acgi?tbart=06521 (downloaded Jul. 13, 2011 from http://www.tidbits.com/article/6521? print version=1).

Bridgman, "Windows XP Expert Zone Community Columnist", Using Windows Mobile-based Portable Media Centers and Windows Media Player 10, Aug. 25, 2004, 1-11. (U.S. Appl. No. 11/519,429).
Bott, "Special Edition Using Microsoft 1-18 Windows Millennium Passage", Special Edition Using Microsoft Windows Millennium Edition, Nov. 3, 2000, pp. 1-24. (U.S. Appl. No. 11/519,429).
Awbrey, "Apple's iPod Available in Stores Tomorrow," Press Release, Nov. 9, 2001 (downloaded Jul. 14, 2011 from http://www.apple.com/pr/library/2001/11/09Apple-s-iPod-Available).
Apple, "Mac OS X: Bonjour," Technology Brief, Apr. 2005, 6-pgs.
Apple, "AirPort Express," Technology Overview, Jul. 2004, 31-pgs.
Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011 (U.S. Appl. No. 11/519,429).
Window's Media Player 6.4, Microsoft Corp., copyright 1999, software available at http://www.oldversion.com/program.php?n=wmp [.about.Downloaded Jul. 13, 2011 at: http://www.microsoft.com/download.en/confirmation.axps?displaylang-en&id=-22758] (U.S. Appl. No. 11/519,429).
Wikipedia: "iTunes", www.wikipedia.com, May 9, 2005, 6 pages. (U.S. Appl. No. 11/519,429).
Wikipedia, "IEEE 1394," 13 pgs (Firewire and also known as Sony's iLink) (downloaded from https://en.wikipedia.org/wiki/IEEE.sub.-1394).
WebReviews.com, "Rio Portable Music Player," 2 pgs, 1999 (downloaded Jan. 25, 2002 from download http://www.webreviews.com/9901/rio.html).
Vetro et al., "Media Conversions to Support Mobile Users," IEEE Canadian Conference on Electrical and Computer Engineering, Piscataway, NJ, May 13, 2001, pp. 606-612 pp. 1-6 from IEEE on Jul. 2011 (U.S. Appl. No. 11/519,429).
TuneBase Pro Mk-II User's Guide, Escient, Inc., (1999) Downloaded Jul. 25, 2011 (U.S. Appl. No, 11/519,429).
TuneBase 100 User Guide, A CD Library Management System, Escient, Inc. copyright 1999. (101 Pages) (U.S. Appl. No. 11/519,429).
Travis Butler, "Portable MP3: The Nomad Jukebox," Aug. 1, 2001, available from http://db.tidbits.com/getbits.acgi?tbart=06261. downloaded Jul. 13, 2011 at http://www.tidbits.com/article/6261 (U.S. Appl. No. 11/519,429).
Travis Butler, "Arches Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?print version=1 (U.S. Appl. No. 11/519,429).
Top Stores of Dec. 18, 2001: Apple posts Automated Scripts for iTunes 2.03. downloaded 9 pages on Apr. 11, 2012 from the internet at: http://www.xlr8yourmac.com/archive/dec01/121801.html (U.S. Appl. No. 11/519,429).
Titmus, Richard, "Softsqueeze 2.0", obtained from http://softsqueeze.sourceforge.netl, generated Jun. 8, 2006, copyright 2004, 2005, 3 pgs.
Stewart et al., "Request for Comments: 3758," Network Working Group, May 2004, 22-pgs.
Steinberg, "Sonicblue Rio Car," Product Review, Dec. 12, 2000 (downloaded from http://electronics.cnet.com/electronics/0-6342420-1304-4098389.html).
SoundJam MP Plus Manual, version 2.0-MP3 Player and Encoder for Macintosh by Jeffrey Robbin, Bill Kincaid and Dave Hller, manual by Tom Negrino, published by Casady & Greene, Inc. 2000. 80 pages (U.S. Appl. No. 11/519,429).
snarfed.org, "History of Synchronizing mp3 playback." obtained from http://snarfed.org/exec/history?name=synchronizing+mp3+playback. generated Jun. 8, 2006. 2-pgs.
snarfed.org, "libmsntp," obtained from http://snarfed.org/space/libmsntp, generated Jun. 8, 2006, undated, 2-pgs.
snarfed.org, "History of Synchronizing mp3 playback," http://snarfed.org/exec/history?name=synchronizing+mp3+playback, generated Jun. 8, 2006, 2 pgs.
Slim Devices, Inc., "Slim Devices: Squeezebox: Free Your Music'.," obtained from http://www.slimdevices.com/index.html, generated Jun. 8, 2006, copyright 2002-2004, 1-pg.

(56) References Cited

OTHER PUBLICATIONS

Slim Devices, Inc. "Squeezebox : Owner's Guide," copyright 2006, 32 pgs.
Slim Devices, Inc. "Slim Devices: Support: FAQ," obtained from http://www.slimdevices.com/su.sub.-faq.html, generated Jun. 21, 2006, copyright 2002-2005, 31 pgs.
Slim Devices, Inc, "Slim Devices: Squeezebox: Overview" obtained from http:www.slimdevices.com/pi.sub.-overview.html, generated Jun. 21, 2006, copyright 2002-0226, 3 pgs.
Skarlatos et al., "Sprite Backup 5.0", Internet Publication, Mar. 6, 2005 (downloaded www.pocketnow.com/index.php?a+portal print &t=review&id=788).
Sinitsyn, "A Synchronization Framework for Personal Mobil Servers," Proceedings of the Second IEEE Annual Conference on Pervasive Computing and communications Workshops, Piscataway, NJ, Mar. 14, 2004, pp. 1-4 5 pages retrieved from IEEE on Jul. 2011 (U.S. Appl. No. 11/519,429).
Shulzrinne et al., "Request for Comments: 3550," Network Working Group, Jul. 2003, 104-pgs.
Shulzrinne et al., "Request for Comments: 2326," Network Working Group, Apr. 1998, 92-pgs.
Schulzrinne Comumbia U A RAO Netscape R Lanphier RealNetworks H: "Real Time Streaming Protocol (RTSP)" IETF Standard, Internet Engineering Task Force, IETF, CH, Apr.
Rosenberg et al., "SIP, Session Initiation Protocol," 20020601-20020600, 194 pgs, Jun. 1, 2001 (downloaded Aug. 18, 2011 from www.rfc-editor.org/in-notes/rfc3261.bd and Apr. 7, 2016 from http://www.softarmor.com/wgdb/docs/draft-ietf-sip-rfc2543bis-08.pdf).
Robbin et al., "SoundJam MP Plus Digital Audio System Version 2," Representative Screens, published by Cassady & Greene, Inc., Salinas, CA, 6 pgs, 2000.
Rio Portable Music Player, Web Review, downloaded Jan. 25, 2002, http://www.webreviews.com/9901/rio.html. (U.S. Appl. No. 11/519,429).
Replay Gain, "Replay Gain—A proposed Standard," Oct. 7, 2001 (downloaded from http://replaygain.hydrogenaudio.org/index.html and http://replaygain.hydrogenaudio.orgioutline.html).
RealJukebox Plus Manual, Real Networks, Inc., copyright 1999, pp. 1-83, RealJukebox, Real Networks, Inc., webpages downloaded Oct. 27, 2005 http://www.real.com/Jukebox/release.sub.-notes.html#. (U.S. Appl. No. 11/519,429).
RCA, "Lyra User's Guide," RD2201/2202/2204, www.lyrazone.com, pp. 1-37, 1999.
Pocket Tunes 5.0.0. copyright 2002-2009 Normsoft, Inc., (pp. 1-25, obtained from the Internet at http://www.pocket-tunes.com/userguide/en.win)—[Downloaded 18 pages on Apr. 10, 2012 at http://www.pocket-tunes.com/userguide/en/) (U.S. Appl. No. 11/519,429).
Pocket PC Phone User Manual, High Tech Computer Corp., 2006; 208 pages, Downloaded Jul. 2011 www.htc.com (U.S. Appl. No. 11/519,429).
Personal Jukebox (PJB), "Systems Research Center and PAAD," Compaq Computer Corp., Oct. 13, 2000, http://research.compaq.com/SRC/pjb/. (U.S. Appl. No. 11/519,429).
Perkins, C., "RTP Audio and Video for the Internet, Chapter 5, RTP Control Protocol", 2003, Addison-Wesley, Boston, USA, pp. 95-111.
Perfect guide for digital/audio technique to enjoy music in PC, Nobuya Fukuda, published in "Nikkei Click", Japan, Nikkei business Publications, Inc., Sep. 8, 1999, vol. 6/No. 10, p. 169. (U.S. Appl. No. 11/519,429).
Palm, Inc., "Handbook for PalmTM m500 Series Handhelds, User Manual," 109 pgs.
Palacharla, et al. "Design and Implementation of a Real-time Multimedia Presentation System using RTP;" Computer Software and Applications Conference; Aug. 13, 1997; pp. 376-381.
Nutzel et al., "Sharing System for Future HiFi Systems", Proceedings of the Fourth International Conference on Web Delivering of Music, Sep. 13, 2004, 8 pgs. [9 pages downloaded] (U.S. Appl. No. 11/519,429).
Nullsoft, "winamp.com / Plug-ins," obtained from http://winamp.com/plugins/details.php?id=15667, generated Jun. 8, 2006, copyright 2006, 2 pgs.
NormSoft, Inc., "Pocket Tunes 5.0.0," 18 pgs, 2009 (http://www.pocket-tunes.com/userguide/en.win, downloaded 18 pages on Apr. 10, 2012 from http://www.pocket-tunes.com/userguide/enl).
Nomad Jukebox, User Guide, Creative Technology Ltd., Version 1, Aug. 2000. [38 pages downloaded Aug. 16, 2011] (U.S. Appl. No. 11/519,429).
Myradus, LLC, "Myradus Media Player Puppeteer for iTunes," obtained from http://www.myradus.com/Product_MediaPlayerPuppeteerForm.aspx, generated Jun. 8, 2006, copyright 2004-2005, 1-pg.
MusicMatch, "Musicmatch and Xing Technology Introduce Musicmatch Jukebox," May 18, 1998 (http:// www.musicmatch.com/info/company/press/rel eases/?year+1998& release=2, downloaded Aug. 16, 2011 from http://www.thefreelibrary.com/MusicMatch+and+Xing+Technolo).
MusicMatch, "About MusicMatch Jukebox," MusicMatch Jukebox v4 Help, 4 pgs, 1999.
Miniman, "Applian Software's Replay Radio and Player v1.02," Product Review, Jul. 31, 2001 (pocketnow.com, http://www.pocketnow.com/reviews/replay.htm, downloaded Aug. 25, 2011 from http://web/archive.org/web/20010805081914/ http://www.pocketnow.com.com/reviews.
Mills, David L., "Request for Comments: 1305," Network Working Group, Mar. 1992, 113-pgs.
Microsoft Corp., "Window's Media Player 6.4," 2 pgs, 1999 (software downloadable at http://www.oldversion.com/program php?n=wmp, downloaded Jul. 13, 2011 from http://www.microsoft.com/download/en/confirmation.axps?displaylangen&id=2- 2758).
Apple Inc., "iTunes, Playlist Related Help Screens," iTunes v1.0, 8 pgs, Jan. 2001.
Apple Inc., "iTunes, Digital Music for your Mac," 2 pgs (downloaded Oct. 22, 2001 from http://www.apple.com/itunes/).
Apple Inc., "Apple-Downloads-Dashboard", http://www.apple.com/downloads/dashboard, downloaded Dec. 16, 2008, pp. 102 (U.S. Appl. No. 11/519,429).
Apple Inc., "Apple Announces iTunes 2," Press Release, 2 pgs, Oct. 23, 2001 (downloaded from http://www.apple.com/pr/library/2001/1 0/23Appl e-Announces-iTunes-2.html).
Apple Inc. "Apple Introduces iTunes—World's Best and Easiest To Use Jukebox Software" MacWorld Expo, San Fancisco, 2 pgs, Jan. 9, 2001 (https://www.apple.com/pr/library/2001/01/09 Apple-Introduces - iTunes - Worlds-Best-and-Easiest-To-Use-Jukebox.
Apple Announces iTunes 2, Press Release, Apple Computer, Inc., dated Oct. 23, 2001 http://www.apple.com/pr/library/2001/10/23Apple-Announces-iTunes- -2.html] downloaded Apr. 8, 2012 (U.S. Appl. No. 11/519,429).
Andy Lindauer, "What's in you Pocket?," Edgereview, downloaded Jan. 25, 2002, http://www.edgereview.com/print.cfm?Type+aag&ID=286 (U.S. Appl. No. 11/519,429).
Andrew Birrell, "Personal Jukebox (PJB)," Oct. 13, 2000 available from http://birrell.org/andrew/talks/pjb-overview.ppt. (U.S. Appl. No. 11/519,429).
Alicia Awbrey, press release entitled "Apple's iPod Available in Stores Tomorrow," Nov. 9, 2001 [downloaded Jul. 14, 2011 at http://www.apple.com/pr/library/2001/11/09Apple-s-iPod-Available] (U.S. Appl. No. 11/519,429).
Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).
AccelerateYourMac.com, Apple posts Automated Scripts for iTunes 2.03, 9 pgs, 2001 (downloaded Apr. 11, 2012 from http://www.x1r8yourmac.com/archive/dec01/121801.html).
About MusicMatch Jukebox, MusicMatch Jukebox v4 Help. pp. 1-4, (1999) (U.S. Appl. No. 11/519,429).
61812006, copyright 2M0P0.6CO2M I Plug-ins, obtained from http://winamp.com/pluginskletails.php?id=15667, generated 8/pgs.
"D-Link's New Wireless Media Device Plays Digital Music, Videos and Photos on Home Television and Stereo:" http://presslink.dlink.com/pr/?prid=136, dated Jan. 20, 2004, 2 pgs.

(56) References Cited

OTHER PUBLICATIONS

"Communication Relating to the Results of the Partial International Search" received in corresponding PCT Application No. PCT/US2006/062355 dated May 3, 2007.

* cited by examiner

NETWORK MEDIA DEVICE

CROSS REFERENCE TO RELATED APPLICATION

This application is a continuation of U.S. application Ser. No. 15/878,208, filed on Jan. 23, 2018, which is a continuation of U.S. application Ser. No. 15/246,011, filed on Aug. 24, 2016, now U.S. Pat. No. 9,876,830 issued Jan. 23, 2018, which is a continuation of U.S. patent application Ser. No. 13/869,238, filed Apr. 24, 2013, now U.S. Pat. No. 9,448,683 issued Sep. 20, 2016, which is a continuation of U.S. patent application Ser. No. 13/175,442, filed Jul. 1, 2011, now U.S. Pat. No. 8,443,038 issued May 14, 2013. This application also claims priority to now-abandoned U.S. patent application Ser. No. 11/530,855, which is titled "Network Media Device, by Jeffrey L. Robbin and David Heller, which was filed Sep. 11, 2006, of which U.S. patent application Ser. No. 13/175,442 is a divisional application.

This application additionally claims priority to pending U.S. patent application Ser. No. 10/862,115, which is titled "Networked Media Station," by Philip F. Kearney et al., which was filed 4 Jun. 2004, of which grandparent application Ser. No. 11/530,855 is a continuation in part This application further claims priority to now-abandoned U.S. patent application Ser. No. 11/306,557, which is titled "System and Method for Synchronizing Media Presentation at Multiple Recipients," by Bob Bradley and Robert D. Newberry, which was filed 2 Jan. 2006, of which grandparent application Ser. No. 11/530,855 is a continuation in part. These applications are incorporated by reference.

This application is also related to pending U.S. patent application Ser. No. 11/519,429, which is titled "Transfer and Synchronization of Media Data," by David Heller, et al., which was filed on 11 Sep. 2006. This application is incorporated by reference.

BACKGROUND

With the increasing capacity and capability of personal computers, as well as improved multimedia interfaces for these computers, it has become popular to use personal computers as a repository for multimedia content, such as songs, movies, etc. Particularly with music, the increased popularity of storing multimedia information on a personal computer has resulted in a variety of products and services to serve this industry. For example, a variety of portable players of encoded multimedia information have been developed, including, for example, the iPod® produced by Apple Computer. Additionality, services have been developed around these devices, which allow consumers to purchase music and other multimedia information in digital form suitable for storage and playback using personal computers, including; for example, the iTunes® music service, also run by Apple Computer. (IPOD and ITUNES are registered trademarks of Apple Computer, Inc).

Services such as iTunes and the substantially unlimited storage space provided by modern personal computer systems have resulted in an environment where many consumers use their personal computer as their primary vehicle for obtaining, storing, and accessing multimedia information. Because consumers may access their multimedia content at virtually any time of the day, however, this implies that one's personal computer system must be powered and operational at all times. Additionally, consumers may prefer to experience certain media content, particularly video content such as movies, using more entertainment-oriented devices such as home theater systems, which typically include larger screens and higher fidelity audio systems than personal computer systems.

Thus, it would be beneficial to provide a mechanism whereby a consumer could off-load, over a computer network, specified multimedia content to a playback device that could at a later time send the information to conventional entertainment devices such as stereo equipment, televisions, home theatre systems, etc.

SUMMARY

A network media device is described that receives multimedia data from one or more sources (e.g., a multimedia website or a multimedia server computer) at a first time, stores it to long-term storage within the device, and transmits the stored multimedia data to one or more designated multimedia playback devices at a second time. In some embodiments, the network media device obtains multimedia data using a pull operation. In one embodiment, the pull operation is effected through an Ethernet (wired or wireless) connection. In another embodiment the pull operation is effected through a peripheral connection (e.g., a USB or FireWire interface). Media content may also be pushed to the device using the same interfaces. In yet another embodiment, the network media device may also stream multimedia data from another source obtained through either a pull or push operation.

DETAILED DESCRIPTION

The following description is presented to enable any person skilled in the art to make and use the invention as claimed and is provided in the context of devices and applications compatible with computer systems manufactured by Apple Computer, Inc. of Cupertino, Calif. Accordingly, the example embodiments described herein are illustrative only and should not be considered limiting in any respect. Further, the claims appended hereto are not intended to be limited by the disclosed embodiments, but are to be accorded their widest scope consistent with the principles and features disclosed herein.

Figure 1:
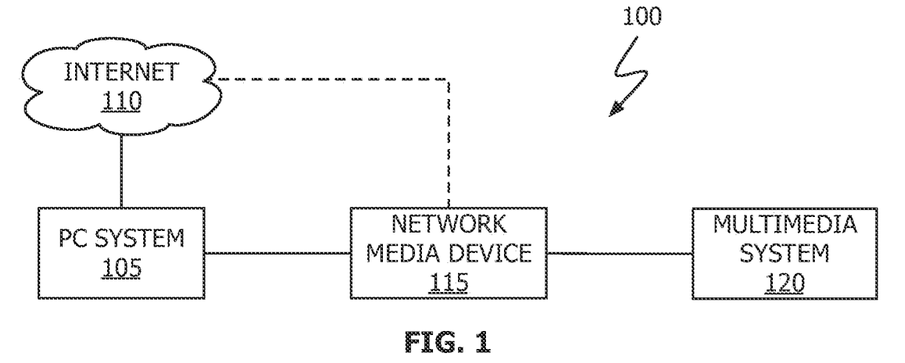
FIG. 1 shows, in block diagram form, a multimedia system in accordance with one embodiment of the invention.

Referring to FIG. 1, illustrative multimedia system 100 is shown as comprising personal computer system 105 coupled to Internet 110 and network media device 115 which, in turn, is coupled to multimedia system 120. Network media device 115 may also be coupled to Internet 110 (see dashed line). Personal computer 105 and network media device 115 may be coupled directly to Internet 110 or indirectly through, for example, a local area network or DSL or cable modem. In general, personal computer system 105 may be any computer system capable of executing a general purpose operating system such as, for example, OS X from Apple Computer or the Windows® or Linux® operating systems, (WINDOWS is a registered trademark of Microsoft corporation. LINUX is a registered trademark of Linus Torvalds.) Multimedia system 120 may comprise any system adapted to receive and play audio (e.g., analog and digital) and/or video (e.g., composite video, S-video, component video, DVI) signals.

Figure 2:
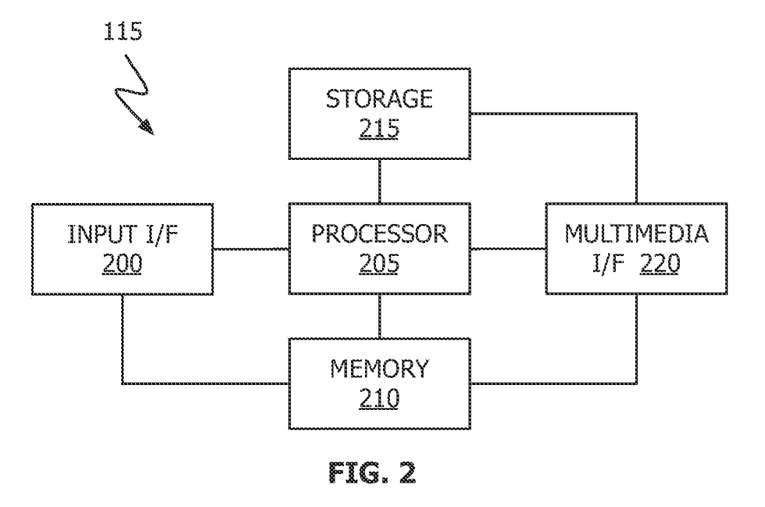
FIG. 2 shows, in block diagram form, a network media device in accordance with one embodiment of the invention.

Referring to FIG. 2, network media device 115 comprises input interface 200, processor unit 205, memory 210, storage 215 and multimedia interface 220. In one embodiment, input interface 200 includes a network interface and a peripheral interface. A network interface provides wired (e.g., Ethernet) and/or wireless (e.g., I5E 802.11b or 802.11g—"WiFi") connectivity to a computer network. A peripheral interface may include one or more connectors suitable for linking to another device such as, for example, a USB, I5E 1394 ("Firewire"), RS-232 (serial interface) or I5E 1284 (parallel interface) bus connectors. Referring to FIG. 1, for example, network media device 115 could be connected to computer system 105 through a wired network connection or by a USB bus and to Internet 110 through a wireless Ethernet connection, Processor 205 may be a single computer processor (e.g., a commercially available CICS or RISC processor), a special purpose processor (e.g., a digital signal processor, "DSP"), a plurality of interconnected processors or a custom designed state machine embodied in, for example, an application specific integrated circuit ("ASIC") or field programmable gate array ("FPGA"). Memory 210 represents random access memory (volatile and/or non-volatile), while storage 215 represents long-term non-volatile memory such as, for example, a magnetic or optical disk unit. As noted above, multimedia interface 220 comprises connectors suitable for transmitting audio (e.g., analog and digital) and/or video (e.g., composite video, S-video, component video, DVI) signals.

As used herein, a network media device (e.g., device 115) is a physical unit having non-volatile long-term storage (e.g., storage 215) and whose operation is governed by a limited-use operating system. By limited-use, it is meant that the operating system does not support the execution of a general purpose user interface (e.g., a standard windowing environment) and, therefore, the execution of general-purpose applications (e.g., word processors and drawing programs).

As noted above, a function of device 115 is to obtain multimedia files, retain them in storage 215, and then transmit them at a later time to one or more multimedia devices (e.g., a stereo or television). To facilitate these operations, device 115 preferably includes a limited-use operating system that provides a user interface to (1) identify and select multimedia files that should be obtained and (2) identify and select which multimedia files to transmit to a designated multimedia device. In one embodiment, this interface is provided through a stand-alone application executing on a general purpose computer system (e.g., personal computer system 105) through for example, an Ethernet connection or a USB port within input interface 200. In another embodiment, device 115 provides a web interface through a network connection (wired or wireless) within input interface 200. It will be recognized that this latter approach is often provided by other network devices such as, for example, routers and firewalls. In still another embodiment device 115 provides a user interface through a connected multimedia playback device such as, for example, a television display. In this embodiment, device 115 could transmit the visual representation of a user interface through a video output connector within multimedia interface 220.

User interaction could be mediated through a special-purpose control device unique to device 115 or a multimedia-aware remote control unit for the display unit (e.g., television). In any of these implementations, sources of multimedia data files available through input interface 200 (i.e., network and/or peripheral connectors) may be identified. For example, multimedia files or directories located on personal computer system 105 or a server computer system coupled to system 100 via Internet 110 (not shown in FIGS. 1 and 2) may be designated as a "source." Once identified, network multimedia device 115 may obtain or download the specified file(s) immediately. Alternatively, network multimedia device 115 may be commanded to obtain one or more multimedia files from a designated source location on a periodic basis. During periodic download operations, it is preferable that files already obtained and resident on storage 215 are not downloaded again. It will be recognized that this latter function is often referred to as "synchronization." Once obtained, the user interface permits a multimedia data file to be transmitted to one or more designated multimedia playback devices. In one embodiment, this action may be performed immediately (that is, as soon as the user designates both a multimedia data file and at least one target multimedia device). In another embodiment, a multimedia data file may be transmitted to one or more designated multimedia devices at a specified time.

In addition to the software-based user interfaces described above multimedia network device 115 may provide a hardware-based interface for media file playback. For example, a surface of device 115 may include a relatively small display on which the contents of storage 215 are displayed. One illustrative display of this type is presented by the iPod electronic device. In addition, conventional PLAY, PAUSE, STOP, SKIP, FORWARD, REVERSE, REPEAT, SELECT and cursor control buttons may be provided. If the aforementioned display is capable, one or more of the identified control buttons may be "soft" buttons. Through these elements, a user may select one or more multimedia files and one or more target multimedia devices on which to play the selected file(s).

Figure 3A:
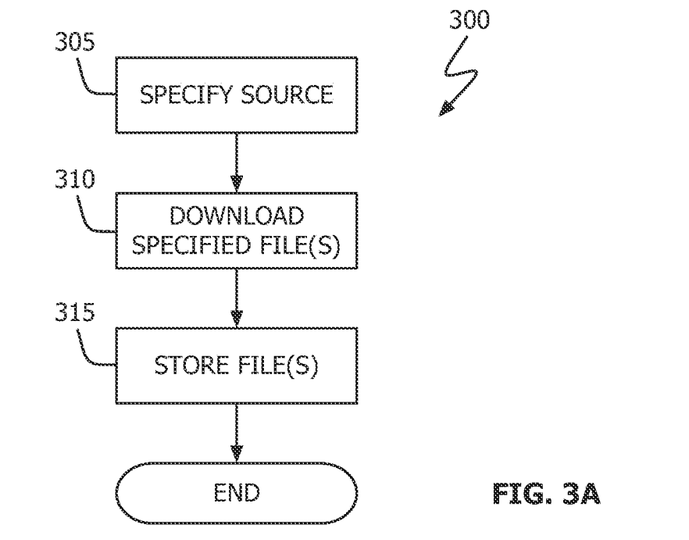
FIGS. 3A and 3B show; in flowchart form; a multimedia data source designation operation in accordance with one embodiment of the invention.
Figure 4A:
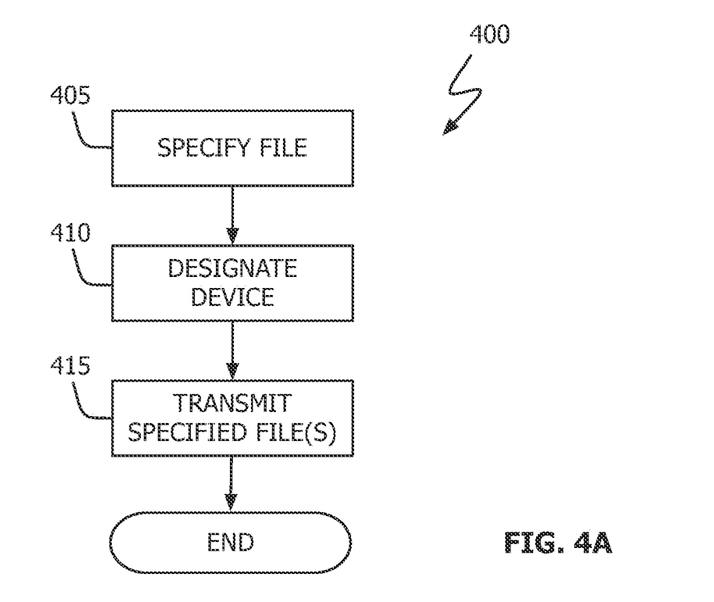
FIGS. 4A and 4B show, in flowchart form, a multimedia playback operation in accordance with one embodiment of the invention.

Referring to FIG. 3A, source designation process 300 for identifying one or more multimedia data files is shown. To begin, a user specifies a multimedia data source (block 305). As described above, this may include one or more files on a computer system directly coupled to multimedia device via a network or peripheral bus connector or indirectly through a computer network (e.g., the Internet or a local area network). Once designated, multimedia device 115 retrieves the specified data (block 310) and stores it internally in storage 215 (block 315). Once obtained in this manner, the multimedia data may be transmitted to one or more target devices for playback/display (see discussion below regarding FIG. 4). Additionally, by user selection, playback/display of the multimedia data may begin immediately upon designation before the transfer of the multimedia data from the source is completed.

Figure 3B:
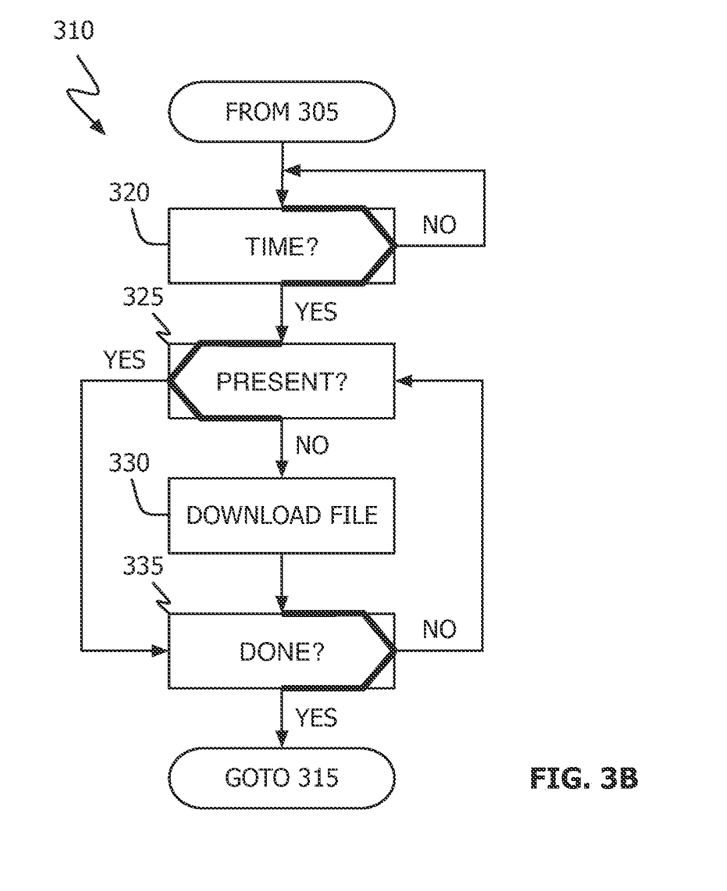

Referring now to FIG. 3B, download operation 310 is shown in greater detail. In the illustrated embodiment, a first check is made to determine if it is the proper time to download the specified file. In one embodiment, a user may specify a time at which a download should occur. In another embodiment, the user may specify an interval after which the specified file may be downloaded. In yet another embodiment, the user may specify a repeating interval wherein one or more files may be downloaded every specified interval (e.g., day or week). It will be appreciated that this latter approach is particularly useful to periodically synchronize storage 215 with one or more other storage locations (e.g. multimedia data servers). If it is not yet time (the "No" prong of block 320), the process waits until the proper time. If it is time (the "Yes" prong of block 320), a second check is made to determine if the specified file is already present in storage 215. If the file is not present (the "No" prong of block 325) the file is downloaded from the specified location (block 330). It will be recognized that some multimedia data sources may stream the specified data to multimedia device 115. In these instances, device 115 may store the data as received (i.e. in a "streaming" format) or it may convert it to a non-streaming format if the file is present (the "Yes" prong of block 325). At completion of the current download operation (block 330), a third check is made to determine if all of the user-specified files have been obtained. If they have (the "Yes" prong of block 335), processing continues at block 315. If they have not (the "no" prong of block 335), processing continues at block 325.

It is noted that multimedia data files may be encoded in accordance with any one of a number of different formats. For example, MPEG-1 (Moving Pictures Experts Group), MPEG-2, MPEG-4 1 MP3®) (Motion Picture Expert's Group Layer 3), A3 (Advanced Audio Coding; a/k/a/ MPEG-4 audio), Quicktime®, AVI(Audio Video Interleave), RI6 (Resource Interchange File Format), WMA (Windows IV1edia Audio), Ogg, etc. (MP3 is a registered trademark of Thomson Multimedia. QUICKTIME is a registered trademark of Apple computer.) The claimed invention may be used to obtain, store and transmit (to a multimedia playback device) data files using any of these, or other, data formats. It will be recognized by one of ordinary skill in the art that multimedia device 115 will incorporate decoder capability for each file format it is configured to process (e.g., software routines).

Referring to FIG. 4, multimedia data playback operation 400 is shown. To begin, a user specifies a multimedia data file for playback (block 405). Next, the user designates one (or more) multimedia playback units to which the specified data file should be sent (block 410). Multimedia device 115 then transmits the specified file to the designated multimedia playback unit. In one embodiment, multiple multimedia files may be selected and sent to one or more playback devices. For example, a music file may be transmitted to a stereo system in a first location while a digital video file may be transmitted to a display device in a second location—at the same time or at different times.

Figure 4B:
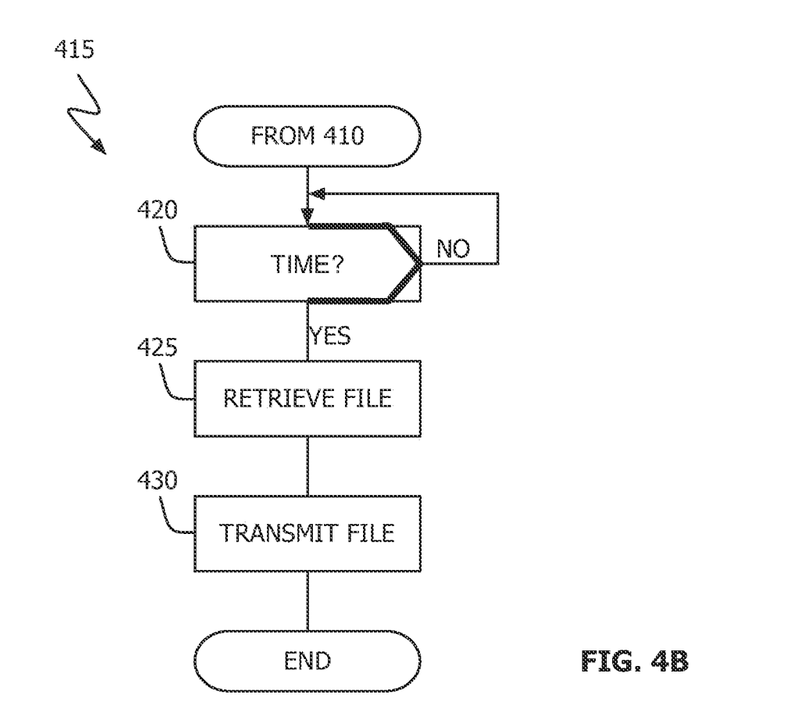

Referring now to FIG. 4B, transmit operation 415 is shown in greater detail. In the illustrated embodiment, a check is made to determine if it is the proper time to transmit the specified file. If it is not yet time (the "No" prong of block 420), the process waits until the proper time. If it is time (the "Yes" prong of block 420), the specified file is retrieved from storage 215 (block 425) and transmitted to the designated multimedia playback device via multimedia interface 220 (block 430). In one embodiment, if the target multimedia playback device supports it, device 115 could determine if the designated playback device is present and/or capable of playing the specified file (e.g., immediately prior to performing the acts of block 430). If the playback device is not available (e.g., not "online") or not able to play the specified file, an error message could be generated and/or other corrective actions taken.

It should be noted that in the discussion of FIGS. 3 and 4, various buffering, error checking, and other data transfer steps implicit in various forms of digital communications have been omitted. Nonetheless, these steps are preferably present and may be implemented in accordance with a variety of techniques known to those skilled in the art. In addition, for security and digital rights management purposes it may be desirable to determine whether networked media device 115 (and/or the user operating same) is authorized to receive the specified multimedia data files. This generally requires some form of authentication, and may be based on a public/private key system.

Because of the potentially rich feature set of network multimedia device 115 and because of the various mechanisms by which the device may interact with other devices, e.g., via network or peripheral interface, etc., the network multimedia device 115 devices preferably includes automated discovery and configuration routines that simplify setup of the device. In one embodiment, for use in a network environment, the network media device 115 may use the Bonjour protocol, developed by Apple computer, to advertise the services it provides on a local network. This allows other devices, such as PC system 105 running Bonjour-compliant software, for example iTunes, to "discover" the network media device 115. Alternatively, the network media device 115 may "discover" services available on the network, such as the aforementioned PC system running iTunes.

Upon discovery of one or more services available on the network, a user interface provided by network multimedia device 115 may present a variety of options to the user. For example, the network multimedia device may present a list of multimedia libraries on the local network to which the network multimedia device may connect. This list of multimedia libraries may include libraries stored on different machines or may include different libraries stored on the same machine. Different libraries stored on the same machine may include libraries belonging to multiple users; e.g., iTunes libraries for multiple people, or may include different types of libraries, such as an iTunes library, an iPhoto® library, etc. (iPHOTO is a registered trademark of Apple Computer, Inc.). Within a given library, content may further be divided into different categories. For example, an iTunes library may include video content (television programs, movies, etc.) and audio content (music; audiobooks; Podcasts, etc.). The user may then select one or more of these shared libraries with which to connect and may further specify specific multimedia content (e.g., files) within the libraries that should be transferred to the device in accordance with one or more of the techniques described herein.

Figure 5:
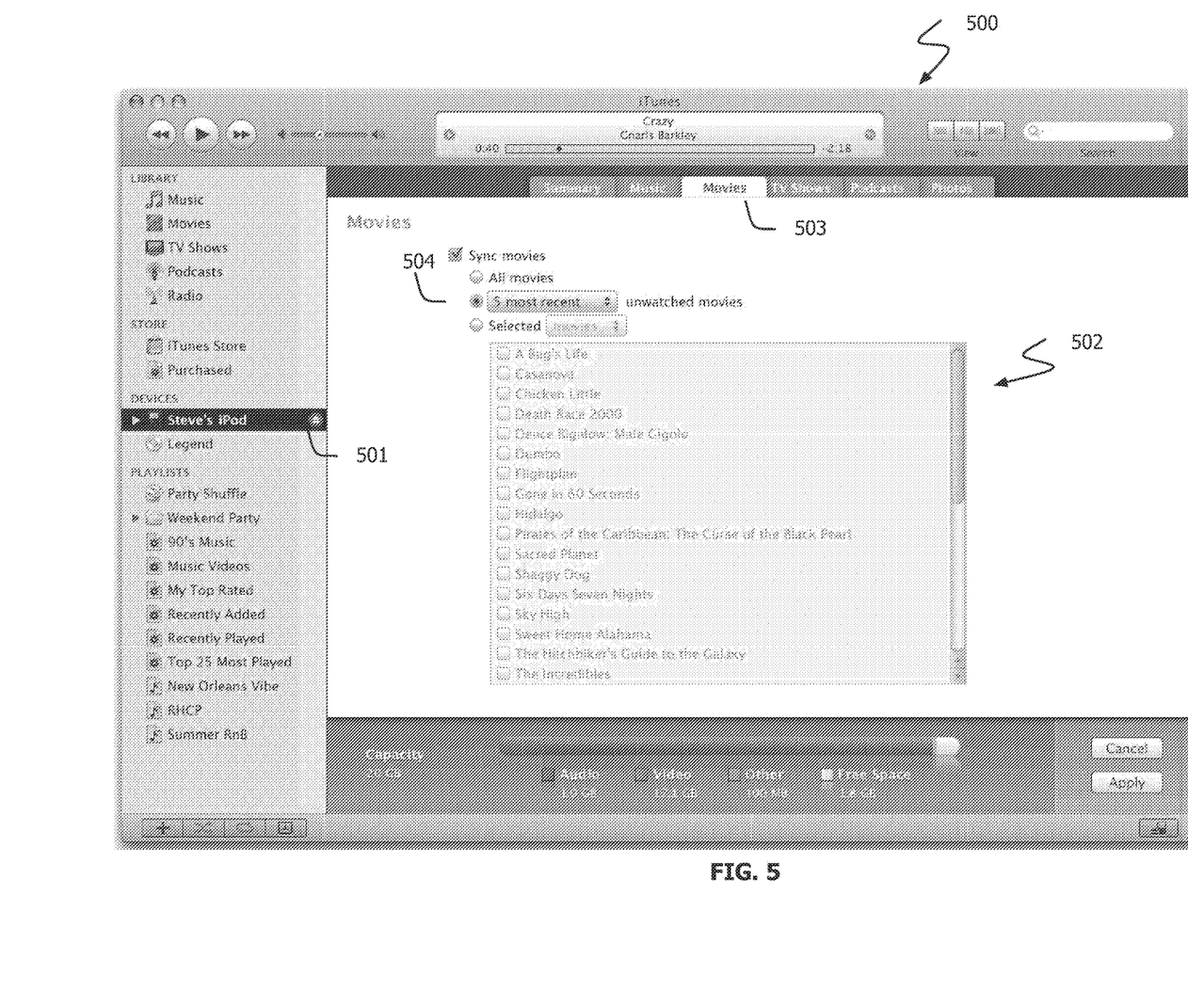
FIG. 5 shows a graphical user interface used to control synchronization between a network media device and a content source in accordance with one embodiment of the invention.
Figure 6:
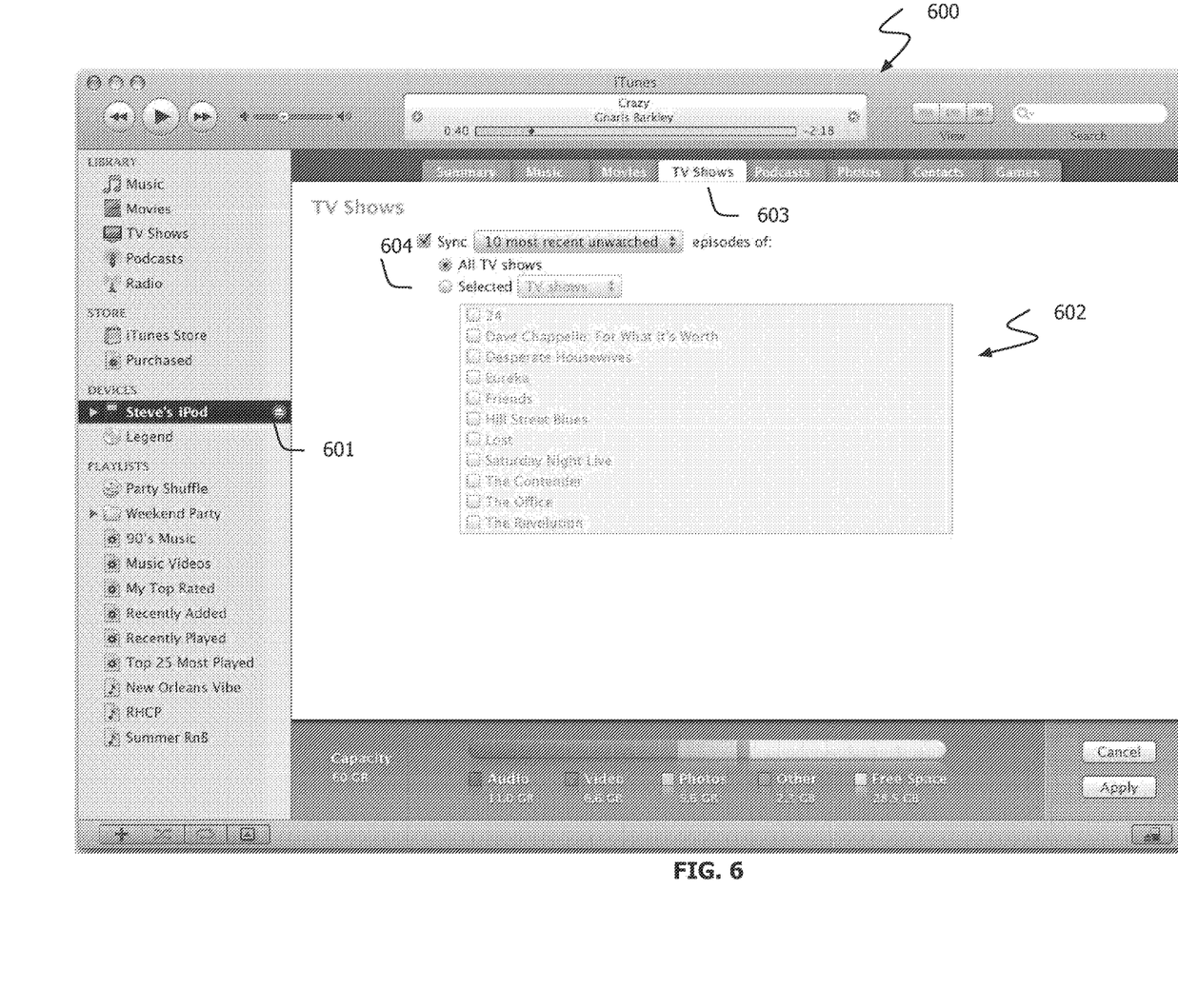
FIG. 6 shows a graphical user interface used to control synchronization between a network media device and a content source in accordance with one embodiment of the invention.

Alternatively, a user interacting with PC system 105 may also discover the services provided by network multimedia device 115. As illustrated in FIGS. 5 and 6, such a device may, for example, show up as a destination 501, 601 for multimedia content in the user interface 500, 600 of a multimedia application. The user interface provided also preferably provides the user a variety of options for which multimedia content will be transferred to the device 502, 602.

In either of the above cases, it may be desirable to "pair," i.e., uniquely associate, a network multimedia device 115 with a particular PC system 105 or a particular library or media application thereon. Upon pairing, the network multimedia device 115 preferably ceases to advertise available services on the local network, as these services are now within the exclusive control of a particular PC system or a particular library/media application thereon. This cessation of advertising services would cause the representation 501, 601 of network multimedia device 115 to "disappear" from the user interface 500, 600 of the media applications running on other PC systems on the network. Additionally, the user interface presented by network multimedia device 115 may cease to display libraries not associated with the paired computer upon establishing a pairing.

The establishment of a pairing permits network multimedia device 115 and PC system 105 to synchronize data between themselves. A variety of synchronization techniques have been developed in the art and may find use in conjunction with the systems described herein. Some particularly advantageous synchronization techniques are described in U.S. Patent Publication 2003/0167318, entitled "Intelligent Synchronization of Media Player with Host Computer"; U.S. Patent Publication 2003/0079038, entitled "Intelligent Interaction Between Media Player and Host Computer"; U.S. Patent Publication 2006/0168351, entitled "Wireless Synchronization Between Media Player and Host Device"; and U.S. patent application Ser. No. 11/324,863 entitled "Remote Content Updates for Portable Media Devices", each of which is hereby incorporated by reference in its entirety.

A wide variety of synchronization parameters may preferably be specified by the user. For example; a user may choose to synchronize certain playlists. Alternatively, a user may choose to synchronize media of a particular type (e.g., video content or audio content) or a particular sub-type (e.g., video content including television programs but not movies) 503, 603. Content to be synchronized may also be specified based on a variety of other parameters 504, 604 associated with the media content. Such parameters may include: content that has not yet been played, purchased content, locally created content, newly downloaded content, content of a certain genre, content that has not been played recently, content that is played frequently, etc. For content that comes in the form of multiple episodes, e.g., television programs, Podcasts, etc., a user may also specify how many episodes should be synchronized (for example, all episodes, unplayed episodes, or a fixed number of episodes).

The synchronization features also preferably include a mechanism for specifying content that will be automatically removed from the network multimedia device 115. For example, because of the relatively high storage requirements of storing video data, it may be desirable to remove video content from the network multimedia device once it has been viewed. Alternatively, time specific content that is sufficiently old that its value has decreased substantially, e.g., week-old news broadcasts, may be automatically removed even if they have not been viewed. Of course these concepts need not be limited to video content and may equally apply to audio content.

It may also be desirable to automatically pass changes made on one device to another without waiting for a user-initiated synchronization. Such synchronization may, for example, be event based. Thus when content is played back on the network multimedia device, its status is updated on the PC system. Similarly, if a particular media file is viewed on the PC system, it may be automatically removed from the network multimedia device. In general, it may be desirable to synchronize any change, whether adding or deleting a file, viewing a file reclassifying a file, etc. upon the occurrence of the event without waiting for a user-initiated or time-based synchronization.

It is not necessary that the network multimedia device 115 only play back content that has been transferred via synchronization with another device, particularly one with which it is paired. For example, in addition to the synchronization techniques described herein, the network multimedia device 115 may also stream content that has not been synchronized. Such content may be either non-synchronized content located on the paired device or may be content located on a non-paired device. The user interface of network multimedia device 115 may present various indications to the user as to what content is stored locally, i.e., that which has been synchronized or otherwise transferred from another device, and that which must be streamed. Such indications may take the form of highlighting, different colors, different screen windows or panes, icons, etc. Additionally, while streaming content, it may be advantageous to transfer content faster than it is played back and cache the not yet needed content on the network multimedia device. This will, in many cases, allow the transfer to be completed long before the transfer would be completed in a classic streaming context. In this way there will be no negative effect if the device from which media is being streamed is taken off line during playback of the media.

One benefit of network multimedia device 115 in accordance with the invention is that relatively large quantities of multimedia data may be obtained via a computer network and stored on the device, whereafter they may be replayed without the need for the original source to be "on-line." In contrast, prior art multimedia devices typically "stream" data so that the data source must be accessible during playback operations.

The network multimedia device 115 may also incorporate instant play technology as disclosed in U.S. patent application Ser. No. 11/131,800 entitled "Media Player with Instant Play Capability," which is incorporated by reference in its entirety.

Various changes in the materials, components, circuit elements, as well as in the details of the illustrated operational methods are possible without departing from the scope of the following claims. For instance, multimedia device 115 may include a status light to provide an indication of the device's operational state. In one embodiment, a status light could be a light emitting diode (LED) or a combination of LEDs integrated into a single package to allow illumination in different colors, e.g. 1 green, red, and/or amber/yellow. For example, the status light may be off to indicate that the device is not powered; the light may flash in a particular color, e.g., green, to indicate that it is powering up and/or going through a startup/self-diagnostic routine; the light may illuminate in a solid color, e.g., green to indicate that it is on and functioning properly; the light may also illuminate or flash in a first color, e.g., yellow, to indicate that a download is in progress and illuminate or flash in a second color, e.g., orange, to indicate a playback transmission is in progress; and the light may illuminate or flash in yet another color, e.g., red, to indicate a problem exists, such as no playback devices in range or no network signal. Further, and as will be recognized by one or ordinary skill in the art, computer program instructions for implementing the described functionality (e.g., FIGS. 3 and 4) may be organized into routines or modules and stored in memory 210 and/or storage 215.

What is claimed is:

1. A method of retrieving multimedia content from a content source, the method comprising:
receiving, via a first playback device, an indication of content to be sent to a second playback device;

receiving, via the first playback device, an indication of one or more services provided by a content source, wherein the indication facilitates discovery of the one or more services by the first playback device;

establishing a paired relationship between the first playback device and the content source;

configuring the first playback device to receive the content from the content source, based at least in part upon the one or more services;

accessing, via the first playback device, the content from the content source based on the indication; and sending, via the first playback device, the content to the second playback device.

2. The method of claim 1, wherein the indication facilitates discovery of the content source by the first playback device.

3. The method of claim 2, wherein the indication of one or more services provided by the content source is provided via at least one network.

4. The method of claim 3, wherein the indication of one or more services provided by the content source is provided using a predetermined protocol for discovery of electronic devices on the at least one network.

5. The method of claim 1, comprising initiating playback of the content at the second playback device via the first playback device.

6. The method of claim 1, comprising initiating playback of the content at the first playback device.

7. The method of claim 1, comprising receiving user input to cause the first playback device to obtain the content from the content source.

8. The method of claim 1, wherein the content source comprises a multimedia website or a multimedia server computer.

9. The method of claim 1, wherein accessing the content comprises retrieving the content via the content source, from a remote source.

10. A playback device, comprising:
one or more processors configured to:
receive an indication of content to be sent to a second playback device;
receive, via the first playback device, an indication of one or more services provided by a content source, wherein the indication facilitates discovery of the one or more services by the playback device;
establish a paired relationship between the playback device and the content source;
configure the playback device to receive the content from the content source based at least in part upon the one or more services;
access the content from the content source based on the indication; and
send the content to the second playback device.

11. The playback device of claim 10, comprising communications circuitry configured to communicatively couple the playback device to the content source.

12. The playback device of claim 10, wherein the playback device is configured to receive user input to cause the playback device to obtain the content from the content source.

13. The playback device of claim 12, wherein the playback device is configured to receive user input to cause the playback device to play back the content.

14. The playback device of claim 12, wherein the playback device is configured to receive user input to cause the second playback device to play back the content.

15. The playback device of claim 10, wherein
the indication facilitates discovery of the content source by the playback device.

16. A non-transitory, computer-readable medium comprising instructions that, when executed, are configured to cause one or more processors to perform a method for receiving content from a content source by a first playback device, the method comprising:
receiving, via the first playback device, an indication of content to be sent to a second playback device;
receiving, via the first playback device, an indication of one or more services provided by a content source, wherein the indication facilitates discovery of the one or more services by the first playback device;
establishing, via the first playback device, a paired relationship between the first playback device and the content source;
configuring the first playback device to receive the content from the content source, based at least in part upon the one or more services;
accessing, via the first playback device, the content from the content source; and
sending, via the first playback device, the content to the second playback device.

17. The non-transitory, computer-readable medium of claim 16, wherein the method comprises:
accessing, via the first playback device, one or more multimedia libraries each comprising one or more multimedia files of the content that may be transferred to the first playback device;
accepting, via the first playback device, user input specifying which of the one or more multimedia files are to be transferred to the one or more processors; and
retrieving, via the first playback device, the specified one or more multimedia files from the content source.

18. The non-transitory, computer-readable medium of claim 16, wherein:
the indication facilitates discovery of the content source by the first playback device;
the method comprises accepting, via the first playback device, user input to establish the paired relationship between the first playback device and the content source; and
establishing the paired relationship comprises establishing, via the first playback device, the paired relationship based upon the user input.

19. The non-transitory, computer-readable medium of claim 16, wherein the paired relationship between the first playback device and the content source is exclusive.

20. The non-transitory, computer-readable medium of claim 16, wherein accessing the content comprises retrieving the content via the content source, from a remote source.

* * * * *